United States Patent [19]

Matsushita et al.

[11] Patent Number: 4,509,366
[45] Date of Patent: Apr. 9, 1985

[54] FLOW METER FOR A TWO-PHASE FLUID

[75] Inventors: Shigetada Matsushita, Tokyo; Yuji Doi, Oita, both of Japan

[73] Assignees: Fuji Electric Co., Ltd., Kanagawa; Nippon Steel Corporation, Tokyo, both of Japan

[21] Appl. No.: 489,294

[22] Filed: Apr. 28, 1983

[30] Foreign Application Priority Data

Apr. 30, 1982 [JP] Japan .................................. 57-73170

[51] Int. Cl.³ .............................. G01F 1/74; G01F 1/86
[52] U.S. Cl. ................................. 73/861.02; 73/861.06; 73/861.04
[58] Field of Search ........... 73/861.02, 861.04, 861.06, 73/861.08, 861.09

[56] References Cited

U.S. PATENT DOCUMENTS 3,595,078  7/1971  Beck ........................ 73/861.06 X Primary Examiner—Charles A. Ruehl
Attorney, Agent, or Firm—Sughrue, Mion, Zinn, Macpeak & Seas

[57] ABSTRACT

A mass flow rate measuring apparatus includes a pair of velocity detecting electrodes spaced by a portion of a wider density detection electrode so as to eliminate any mutual interference between the velocity detecting electrodes. A temperature compensation circuit is used to compensate for errors in the density measurement otherwise caused by the temperature characteristic of the flow pipe and the carrier medium.

7 Claims, 8 Drawing Figures

FLOW METER FOR A TWO-PHASE FLUID

BACKGROUND OF THE INVENTION

The present invention relates to an apparatus for measuring the mass flow rate of a powderous body flowing in a pipe arrangement using an electrostatic capacity detector and a mutual correlation method.

In a flow meter of this type, it is difficult to maintain desirable precision in the measured value of the flow rate since the flowing manner of a powdered body is in general widely changed in accordance with the grain size and the specific gravity of the body, the pressure and the velocity of flow of the carrier gas, and the formation of the pipe arrangement.

Referring to FIG. 1, the arrangement of a conventional flow meter of this type is shown. In FIG. 1, a powder 2 flows in a pipe 1 in the direction shown by the arrow. An electrode plate 3 having a large width is mounted on the outer wall of the pipe 1 to detect the density of the powder body, and electrode plates 4 and 5 having a narrow width are mounted on the outer wall of the pipe 1 to detect the velocity of flow of the powder body. The electrode plate 4 is positioned apart from the electrode plate 5 by the distance L. The electrostatic capacity is increased when the powder body 2 arrives at the density detecting electrode 3, and the increment thereof is converted to an electric signal by an electrostatic capacity converter 6 to represent a density indication $\rho$.

On the other hand, the change in electrostatic capacity due to the velocity detecting electrodes 4 and 5 is converted to an electric signal $u_1$ at upstream side and an electric signal $u_2$ at downstream side by electrostatic capacity converters 7 and 8, respectively. A velocity meter of the correlation type receiving the upstream signal $u_1$ and the downstream signal $u_2$ effects mutual correlation between the upstream and downstream signals $u_1$ and $u_2$, and provides a delay time $\tau$ therebetween, and further operates to calculate $v=L/\tau$ to produce an output signal representing the flow velocity v. The output of the mass flow meter is obtained by multiplication of the density indication $\rho$ and the flow velocity indication v using a multiplexer 10.

The above-mentioned system for obtaining the mass flow rate of a powder body is known from publications such as "Iron and Steel", April 1968, page 5. Such a system has the following disadvantages. One disadvantage relates to the electrode plates 4 and 5 for detecting the flow velocity. The electric force lines produced between the velocity detecting electrode plates 4 and 5 mounted on the wall of the pipe 1 are formed as shown in FIG. 2. Therefore, the electrode plates detect the powder body over a wide range. Especially in the case where the upstream side electrode plate 4 is located adjacent to the downstream side electrode plate 5, the electric force lines produced by the upsteam and downstream side electric plates 4 and 5 overlap each other. In this case, the separation between the output signals obtained by the electrode plates 4 and 5 becomes unclear to thereby round off the peak point of the correlation curve obtained.

In the case where ultrasonic oscillating elements 11 and 13 and ultrasonic receiving elements 12 and 14 are used for detection as shown in FIG. 3, or in the case where a light source and a light receiving element are used for detection, the possible range of detection is narrow and further the boundary becomes clear. However, detecting methods such as those just mentioned are not suitable for the measurement of the flow rate of a powder body, because absorption and dispersion due to the powder body are large, so that the ultrasonic waves and light cannot reach the receiver elements 12 and 14.

The other of the disadvantages of the abovementioned system relates to the density detection. In a density meter of this type, the amount of change in electrostatic capacity, which represents the density of the objective component to be measured, is very small in comparison to the value of the electrostatic capacity between the vessel and medium. Therefore, since the absolute value of the electrostatic capacity of the objective component is very small, large errors due to temperature change are undesirably produced even if the electrostatic capacity between the vessel and the medium is only slightly changed in accordance with the change in ambient temperature and that of the medium. For example, in the case shown in FIG. 4, where electrode plates 42 and 43 having a length dimension of 15 cm and a width of 3 cm, respectively, are mounted on an outer wall of a ceramic pipe 41 having an external diameter of 35 mm and an internal diameter of 25 mm, the detected value of the electrostatic capacity between the electrode plates 42 and 43 is about 20 pF with air in the ceramic pipe 41, and is increased by about 0.2 pF when the powder body is located within the ceramic pipe 41. At that time, if the change in the electrostatic capacity of the ceramic pipe with respect to temperature is 100 ppm/° C., a change of 0.02 pF may be produced by a temperature change 10° C. This corresponds to an error of 10% when the density of the powder body is maximally set at 0.2 pF.

SUMMARY OF THE INVENTION

The object of the present invention is to provide a flow meter for a powder body having high precision in which the measurement error of flow velocity due to bad separation of the signals from upstream and downstream electrode plates because of flare or extension of the electric force lines thereof is eliminated, and further where a temperature error in the density detection due to the temperature characteristic of the dielectric constant of a ceramic flow conduit is eliminated.

DETAILED DESCRIPTION OF THE PREFERRED EMBODIMENTS

Figure 5:
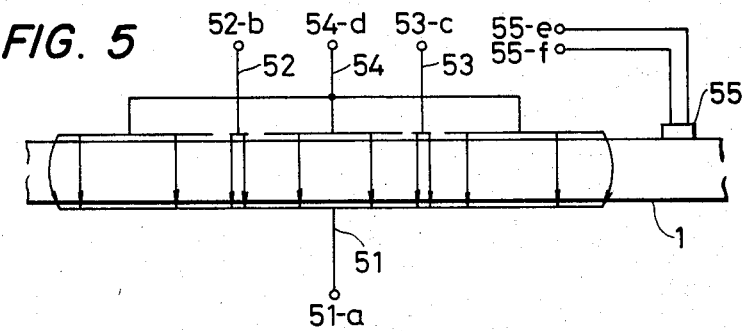
FIG. 5 shows an embodiment of the flow meter of the present invention.
Figure 6:
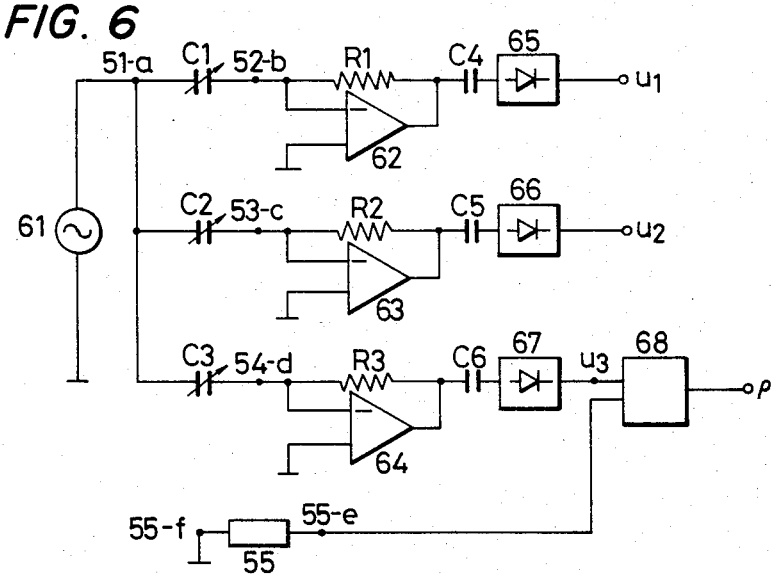
FIG. 6 is a circuit diagram of a device for detecting the flow rate in the present invention.

Referring now to FIGS. 5 and 6, an embodiment of the present invention is shown. In FIG. 5, there are mounted on the outer wall of a pipe 1, a common electrode plate 51, electrode plates 52 and 53 for detecting the velocity of flow, an electrode plate 54 for detecting the density of the powder body, and a temperature detecting element 55 In FIG. 6, $c_1$ denotes the electrostatic capacity produced between the common electrode plate 51 and the electrode plate 52 for detecting the velocity of flow; $c_2$, the electrostatic capacity between the common electrode plate 51 and the electrode plate 53 for detecting the velocity of flow; and $c_3$, the electrostatic capacity between the common electrode plate 51 and the electrode plate 54 for detecting the density of the powder body.

FIG. 6 shows the detecting circuit for detecting the electrostatic capacity. One end of a high frequency sine-wave generator 61 is connected to the terminal 51-$a$ of the common electrode plate 51 in FIG. 5, and the terminal 52-$b$ of the flow velocity detecting electrode plate 52 in FIG. 5 is connected to the input terminal of a current amplifier 62. The output terminal of current amplifier 62 is connected to the negative input terminal through a resistor $R_1$. The output of the current amplifier 62 is a signal $u_1$ representing the upstream side flow taken out via a condenser $c_4$ and a rectifying circuit 65. The terminal 53-$c$ of the flow velocity detecting electrode plate 53 is similarly connected to a current amplifier 63, a resistor $R_2$, a condenser $c_5$, and a rectifier circuit 66 to thereby produce an output signal $u_2$ representing the downstream side flow. Further the terminal 54-$d$ of the density detecting electrode plate 54 is similarly connected to a current amplifier 64, a resistor $R_3$, a condenser $c_6$, and a rectifier circuit 66 to thereby produce a signal $u_3$ representing the density of the powder body. On the other hand, the terminals 55-$e$ and 55-$f$ of the temperature detector 55 are connected to a temperature compensation circuit 68 to compensate the density signal $u_3$ with respect to the temperature, to thereby produce a compensated density signal $p$.

As mentioned above, DC current cutoff condensers $c_4$, $c_5$ and $c_6$ are connected to the outputs of the current amplifiers 62, 63 and 64 respectively, and therefore the DC voltage produced by the attachment of static electricity, which is always produced upon the flow of the powder body to the electrode plates 51, 52, 53 and 54, is stopped by the condensers, and further any offset voltage of the current amplifiers 62, 63 and 64 is also stopped by these condensers. Therefore, the flow velocity signal $u_1$ and $u_2$ and the density signal $p$ are not affected by undesirable influences.

Figure 7:
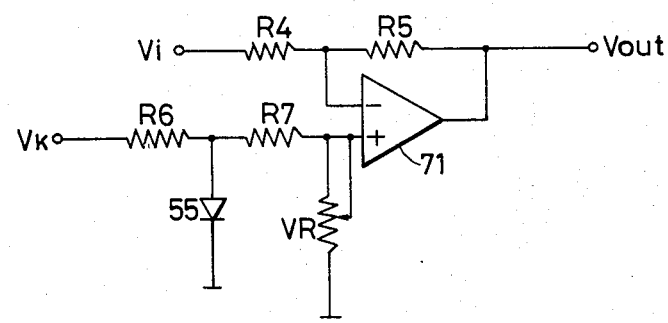
FIG. 7 shows one embodiment of a temperature compensation circuit of the present invention.

Referring to FIG. 7, an embodiment of the temperature compensation circuit is shown. In FIG. 7, the negative input terminal of a differential amplifier 71 receives an input signal $V_i$ through a resistor $R_4$, and the output terminal thereof is connected to the negative input terminal through a resistor $R_5$. On the other hand, the positive input terminal of the differential amplifier 71 is supplied with the voltage across a temperature detector such as a diode 55 or a thermister, as divided by a resistor $R_7$ and a variable resistor VR.

Figure 8:
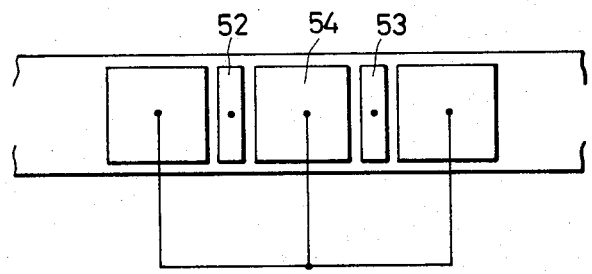
FIG. 8 shows the electrode arrangement of the flow rate detecting portion of the present invention.

Referring to FIG. 8, there is shown an example of the specific arrangement of the electrode plates mentioned above. The electrode plates are arranged in a manner such that the narrow electrode plates 52 and 53 for detecting the flow velocity are surrounded by the electrode plate 54 having the wider width for detecting the density of the powder body.

According to the present invention, the common electrode plate 51 is supplied with the voltage from the high frequency sine-wave generator 61. Further the flow velocity detecting electrode plates 52 and 53, and the density detecting electrode plate 54 are connected to the negative input terminals of current amplifiers 62, 63, and 64, respectively, and further, the positive terminals thereof are connected to zero potential. The negative terminals 52-$b$, 53-$c$ and 54-$d$ are at virtually zero potential. Therefore, all of the electrode plates 52, 53, and 54 have about zero voltage.

Figure 1:
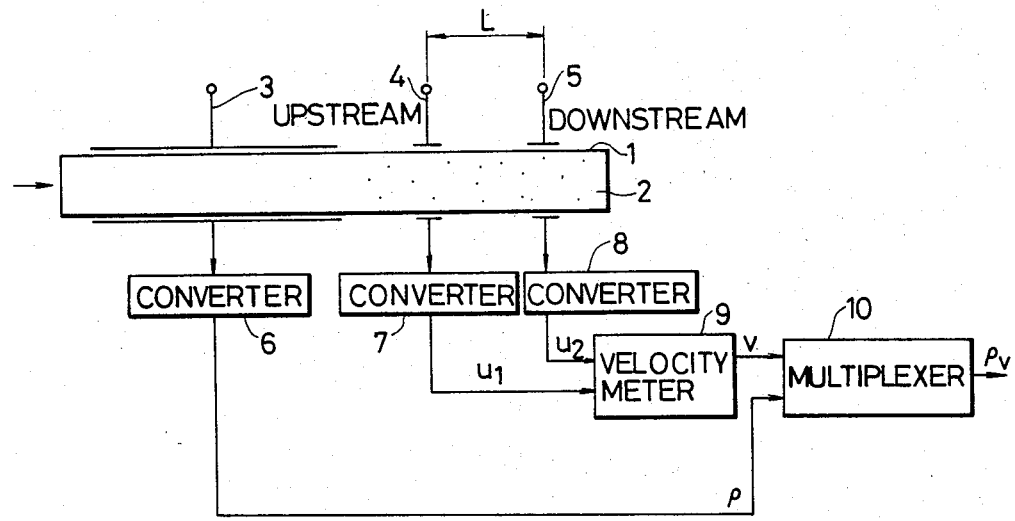
FIG. 1 is a block diagram of a conventional flow meter for a powder body of the correlation type.
Figure 2:
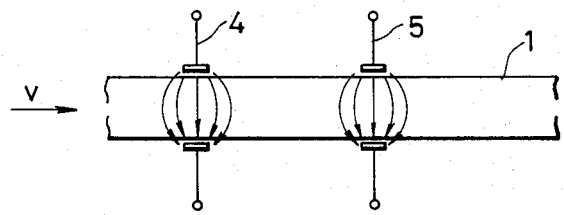
FIG. 2 is a schematic diagram of conventional electrodes for detecting the velocity of flow.
Figure 3:
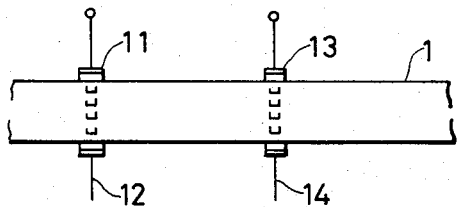
FIG. 3 is a schematic diagram of conventional ultrasonic detectors.
Figure 4:
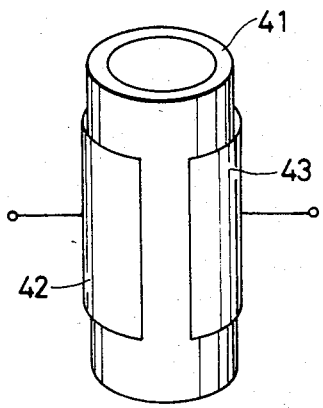
FIG. 4 is a perspective view of a density detecting portion.

Therefore, the electric force lines of the flow velocity detecting electrode plates 52 and 53 are, as shown in FIG. 5, formed in parallel and uniformly because the wide density detecting electrode plate 54 functions as a guard electrode plate. The signals obtained by the flow velocity detecting electrode plates 52 and 53 thus arranged are different from that of the electrode plates 4 and 5 of FIG. 2 and can be mutually clearly separated without mutual interference. Therefore, the indication of the velocity of flow v obtained by the mutual correlative method has higher precision in comparison with the signals obtained by the conventional electrode arrangement.

Further, according to the circuit configuration of the present invention, a temperature detecting element 55 is mounted on the pipe 1 to detect the temperature of the pipe, and the temperature characteristic of the electrostatic capacitance $c_3$ of the pipe 1 is compensated by the temperature compensation circuit 68. The temperature compensation circuit 68 may be adjusted in a manner such that the temperature change at zero density is first measured by increasing the temperature of the pipe and the medium when no object component to be measured is within the pipe. A temperature change is produced, and then the effect of the temperature change is eliminated by the temperature compensation circuit 68, to thereby eliminate any temperature error in the measured density due to the temperature characteristic of the pipe and medium.

In the embodiment described above, the measurement of the flow rate of a powder body on the basis of an electrostatic capacity detector and a flow velocity measuring method of the mutual correlation type is disclosed, however, the principles disclosed in the above embodiment can be applied to a flow meter for any two-phase or two component fluid such as gas-liquid, solid-liquid, solidgas, gas-gas, and liquid-liquid mixtures.

What is claimed is:

1. In a flow meter for measuring the mass flow of a two-phase fluid flowing through a pipe arrangement using an electrostatic capacity detector and mutual correlation method, the improvement comprising a first common electrode mounted proximate the outerwall of said pipe and extending along a certain length of said pipe on one side of said pipe, a pair of second and third electrodes mounted proximate said outerwall opposite said first common electrode for detecting the fluid flow velocity, each of said pair of electrodes extending along only a small portion of said certain length, and a fourth electrode for detecting the fluid density mounted proximate said outerwall opposite said common electrode, said fourth electrode extending along said outerwall upstream and downstream of each of said pair of electrodes and extending along said outerwall a greater length than said pair of electrodes.

2. An apparatus as claimed in claim 1, further comprising an electrostatic capacity detector having a circuit configuration such that said common electrode is connected to a high frequency sine-wave generator, said pair of electrodes for detecting the flow velocity and said fourth electrode for detecting the density each being connected to current amplifiers, respectively.

3. An apparatus as claimed in claim 2, wherein said second through fourth electrodes are each connected to a negative input terminal of said amplifiers, said negative terminals each being connected to output terminals of said current amplifiers, respectively, through a resistor, and each of said positive input terminals being connected to a common reference point.

4. An apparatus as claimed in claim 2, and further comprising rectifiers having inputs connected to outputs of said amplifiers through D.C. current blocking condensers, respectively.

5. An apparatus as claimed in claim 1, and further comprising a temperature detecting element mounted on said pipe, and a temperature compensation circuit for compensating the temperature characteristic of said pipe in response to a density detection signal and a temperature signal from said temperature detecting element.

6. An apparatus as claimed in claim 5, said temperature compensation circuit comprising a differential amplifier respectively receiving inputs from said temperature detecting element and from an amplifier coupled to said fourth electrode.

7. An apparatus as claimed in claim 1, said pair of electrodes being arranged respectively between electrically connected portions of said fourth electrode.

* * * * *